Figure 1:
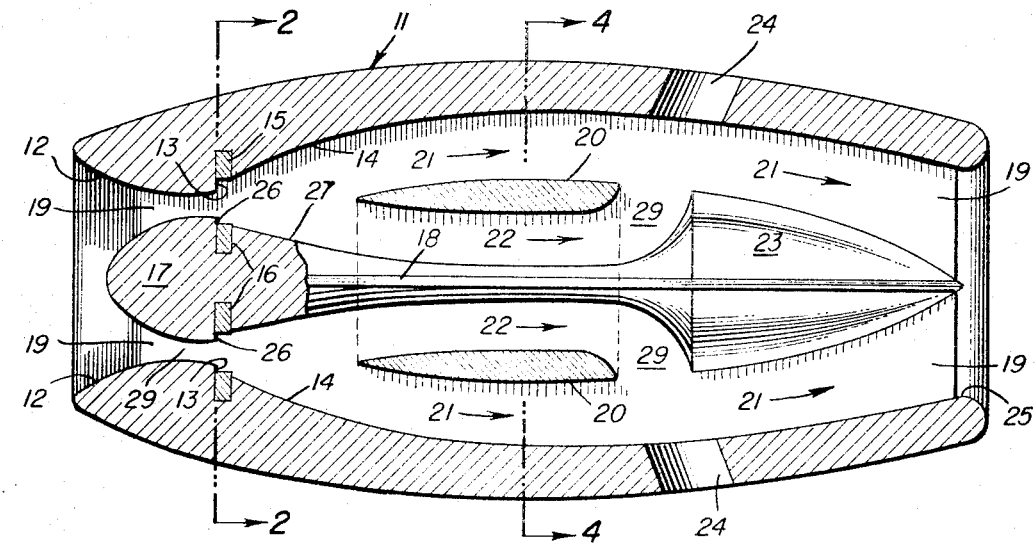

Oct. 4, 1966   G. D. LEWIS ET AL   3,276,473
BI-STABLE FLUID VALVE

Filed July 30, 1963   2 Sheets-Sheet 1

INVENTORS
George D. Lewis
Burton A. Jones

BY Claude Funkhouser
ATTORNEY 3,276,473
BI-STABLE FLUID VALVE
George D. Lewis and Burton A. Jones, North Palm Beach, Fla., assignors, by mesne assignments, to the United States of America as represented by the Secretary of the Navy
Filed July 30, 1963, Ser. No. 299,452
3 Claims. (Cl. 137—594)

The present invention is directed to a fluid control device known as a fluid amplifier, and is more particularly directed to a fluid valve which is applicable to the spave environment.

The aerospace age has fostered an imperative need for components to be used in aerospace vehicles which are compact, light in weight, simply constructed, efficient, and above all, reliable. The search for components having such requisites has been pursued by those skilled in the art of the various systems of which an aerospace vehicle is concerned. Almost all aerospace vehicles, aerospace vehicles generically encompassing high performance aircraft and space vehicles, utilize in some form or another various fluid systems. These fluid systems utilize various control devices such as valves and regulators to control either a liquid or a gas. Any reduction in weight of any of the components utilized in the various fluid systems of aerospace vehicles is, therefore, a very significant and favorable contribution to the performance of the aerospace vehicle.

Although there are various needs for fluid systems in aerospace vehicles, probably the two most prominent utilizations of fluid flow in aerospace vehicles are concerned with the guidance of the vehicle. The first by utilizing fluid to control the thrust vector of the vehicle powerplant and the second to utilize fluid jets which are exhausted at various points on the space vehicle to thereby propel the vehicle in the opposite direction and effect the guidance thereof. Basic to the guidance of an aerospace vehicle are the control functions in pitch and yaw. These control functions require a minimum of four control actions; that is to say, there are two directions of movement in pitch which must be controlled and there are two movements in yaw which must be controlled. These four basic functions are necessary in the guidance of any aerospace vehicle whether it be a space vehicle which is operated in space or a high performance aircraft which is operated in the atmosphere. When the thrust of the aerospace vehicle powerplant is controlled so as to effect guidance in pitch and yaw the fluid is injected into the main jet exhaust of the powerplant, at a minimum of four stations which are 90 degrees apart, to disturb the exhaust and misalign the thrust vector to thereby effect the guidance of the vehicle. On the other hand, the guidance of the vehicle may be attained by utilizing four outlets, which are 90 degrees apart, on the body of the vehicle to act as jets and thereby propel the vehicle in a given direction to effect the guidance thereof.

As is well known in the art, many lines and valves of the conventional type are necessary to direct a source of high pressure fluid to one of the minimum of four points required in either of the aforementioned methods of effecting guidance of an aerospace vehicle. The normal method of subdividing a source of fluid so that it may be passed to one of four points is that of passing through a first valve which directs the flow into one of two passages; each of the passages in turn having a second valve which also divides the flow or directs the flow into one of two additional passages thereby enabling a source of high pressure fluid to be passed to one of four points. Further connection of multiple valves in series would enable the source of fluid to be sent to any one of a plurality of outlets. Clearly, if one device could be utilized to subdivide the source of high pressure fluid into a plurality of outlets, very significant advantages could be attained over a system of valves and components due to the significant advantages in weight, compactness, system simplicity, and reliability which could be attained.

It is therefore the general purpose of this invention to provide a fluid control device which embraces all of the advantages of similarly employed prior art devices and possesses none of the aforedescribed disadvantages. To attain this, the present invention contemplates a unique arrangement of components so as to provide a unitary device which divides the flow of fluid from a source and controls the fluid flow so as to direct it to one or more points where it is to be utilized.

Accordingly, it is an object of the present invention to provide a fluid control device which is workable in the space environment to direct a source of fluid to a plurality of points of utilization.

Another object is to provide a fluid control device capable of minimizing the complexity of fluid distribution systems necessary to distribute fluid from a source to various points for utilization.

A further object of the invention is the provision of a fluid control device which provides high performance, reduced weight, and reliable operation.

Still another object is to provide a fluid control device comprised of a minimum number of moving parts, which device is exceptionally rugged, economical to manufacture, and which will distribute fluid from a source of fluid to one or more outlets.

Yet another object of the present invention is the utilization of a plurality of fluid amplifiers, which are operable in an atmosphere of zero or little pressure, to form a fluid distribution device.

Figure 2:
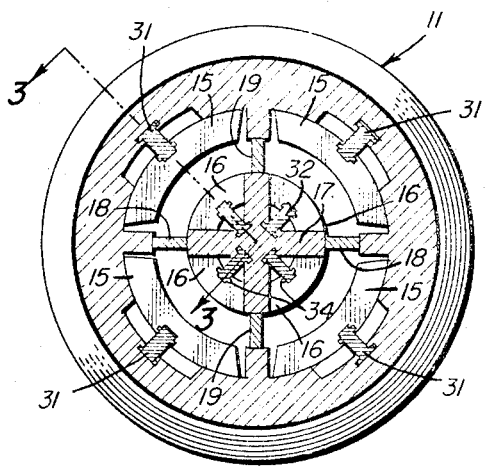
Figure 3:
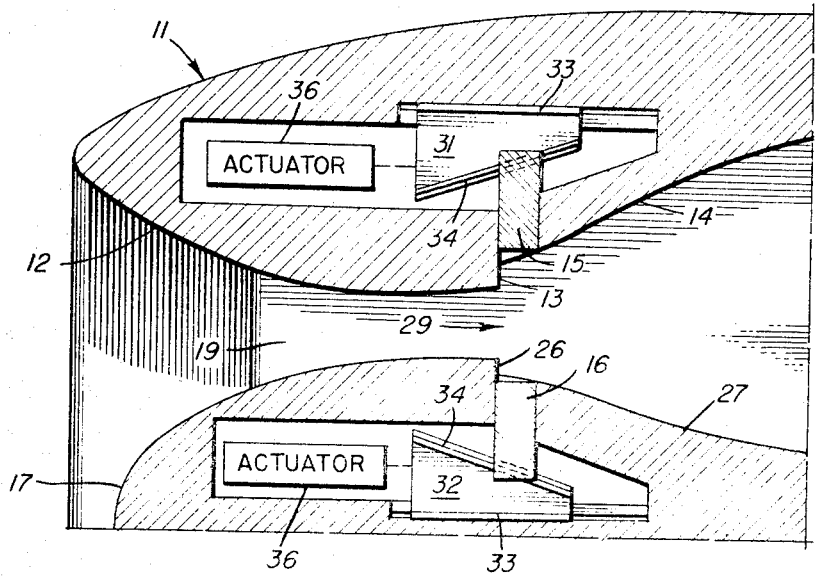
Figure 4:
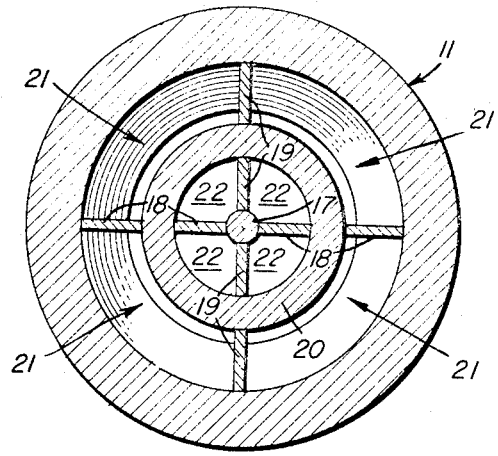

Other objects and many of the attendant advantages of this invention will be readily appreicated as the same becomes better understood by reference to the following detailed description when considered in connection with the accompanying drawings wherein:

FIG. 1 is a cross-sectional view of an illustrative embodiment of the present invention;
FIG. 2 is a cross-sectional view of the device of FIG. 1 taken along line 2—2;
FIG. 3 is a cross-sectional view of the illustrative embodiment taken along 3—3 of FIG. 2; and
FIG. 4 is a cross-sectional view of the illustrative embodiment taken along line 4—4 of FIG. 1.

In FIG. 1 there is disclosed a cylindrical or tubular body member 11 which has a passage extending therethrough with an inlet 12 and an exhaust outlet 25. Suspended at the center of the body member 11 is a circular member which has a varying diameter in that the extremities of the member are generally of a larger diameter than the ends 17 and 23. The central circular member 17 and 23 is supported by partitions or dividers 18 and 19 which divide the fluid flow that enters the inlet 12 into four portions; that is to say, the partitions or dividers 18 and 19 divide the body 11 into four quadrants. The body member 11 and the central member 17 form an annular flow path which is divided into four portions by the partitions 18 and 19. Also formed by the member 17 and the body 11 is the restriction or throat area 29. On the outlet side of the throat 29 there are disposed on the inner and outer diameter, respectively, of the annular flow path formed by the member 17 and the body 11, reliefs between the points 13 and 14 on the body member 11 and points 26 and 27 on the forward portion 17 of the central circular member. As the fluid flow passes along the walls of the throat 29 and approaches the points 13 and 26, it is following the contour of the walls, but at point 13 and 26, respectively, the wall breaks away and the fluid flow does not recontact either wall until approximately point 14 or 27, respectively, which in turn causes a low pressure area to be formed adjacent either point 13 or 26, depending upon the condition as to through which of the outlets 21 or 22 the fluid is flowing. Therefore, if the fluid which is entering the device is passing past the point 13 and recontacting the wall at 14, the low pressure created by the relief acting in conjunction with the static pressure in the outlet 22 will hold the fluid into a flow path taking it through passage 21; likewise, if the flow has been directed to passage 22, it will remain there, if undisturbed, due to the low pressure area formed adjacent the relief 26 acting in conjunction with the static pressure in outlet 21. This is the basic operating principle of a fluid amplifier which has been quite widely publicized in the literature and disclosed in at least one pending patent application. One of the original fluid amplifiers is fully disclosed in U.S. patent application Serial No. 51,896 of Billy M. Horton, filed September 19, 1960, now Patent 3,122,165, issued February 25, 1964.

Surrounding the central circular member 17–23 is an annular member 20 which is secured in place by the partitions 18 and 19. The annular member 20 acts as a flow divider and thereby provides two alternative outlets 21 and 22 for the fluid which leaves the throat area 29. Between the annular flow divider 20 and the body portion 11 is formed an outlet passage 21 and due to the partitions 18 and 19 there are four such outlet passages, one in each guadrant. Also, between the annular flow divider 20 and the central circular member 17–23 there is formed a second outlet passage 22 which directs the fluid flow through the passage 21 to an exit 24 in the body member 11. Likewise, there are four such exits 24 in the body member 11, one for each quadrant formed by the partitions 18 and 19. The fluid thus received by the fluid device passes either through passage 21 and out exhaust 25 or passes through passage 22 and out exit 24.

In order to determine in which of the two outlets 21, 22 the fluid flow will be directed, each quadrant is provided with tabs 15 and 16. The tabs 15 are slidably disposed in the body member 11 so that they may be inserted into the fluid flow path at the relief 13, and if the fluid flow is passing in passage 21, to thereby disrupt the low pressure area formed adjacent the relief 13 and to cause the fluid flow to be directed into the alternative outlet passage 22. In a like manner if the fluid flow in a particular quadrant is passing past the relief 26 and through passage 22, the insertion of the tab 16 into the fluid flow will disrupt the low pressure area formed adjacent the relief 26 and thereby direct the fluid flow into the outlet passage 21.

FIG. 2 more clearly shows the disposition of the tabs 15 and 16 which are actuated by the wedge members 31 and 32. The wedges 31 and 32 are more clearly shown in the enlarged sectional view of FIG. 3. As is apparent from FIG. 2, the partitions 18 and 19, which are disposed at right angles to each other and the planes of which intersect at the center of the center circular member 17–23, divide the body member into four quadrants so that therein four separate flow passages are established. Within each quadrant and associated with each of the four flow passages are the tab members 15 and 16. Each set of tab members 15 and 16 controls the fluid flow in its respective passage. The tab members 15 and 16 are actuated and moved into fluid flow stream at the throat 29 by means of the wedge members 31 and 32 respectively. The wedge members 31 and 32 maintain a positive movement, both for insertion into the fluid flow and retraction from the fluid flow, of the tabs 15 and 16, respectively, by means of tongue and grooves 33 between the wedge and the body 11 and tongue and groove 34 between the wedge and the tabs 15 and 16. Actuators 36 are respectively attached to each individual wedge to move the wedge and thereby move the respective tab into the respective fluid flow. It is to be understood that the actuators may be of any type such as an electrical solenoid, a hydraulic actuator, a pneumatic actuator, or any other such means. It is also noted that the wedges 31 and 32 may be replaced by any such actuator which could be directly connected to the tab.

FIG. 3 is an enlarged cross-sectional view taken along line 3—3 of FIG. 2 and more clearly shows the disposition and interactions of the actuators and the tabs. As the actuator moves the wedge 31 to the right, the tab 15 moves past the relief 13 into the throat area 29. In a similar manner the tab 16 is moved past the relief 26 into the throat 29 when the actuator moves the wedge 32 to the right.

FIG. 4 more clearly shows the disposition and the relative association of the body member 11 with the partitions 18 and 19 and the annular flow divider 20. As disclosed in FIG. 4, the partition members 18 and 19 divide the passageway through the body member 11 into four paths which are in turn divided again by the annular flow divider 20 to form two outlet passages 21 and 22 in each of the respective quadrants formed by the partitions 18 and 19.

For the incorporation of this fluid valve arrangement into a system, there could be ducting means associated with the valve member 11 to duct a source of fluid into the inlet 12 and further separate ducting means to duct the fluid from the four respective exits 24. Normally, the fluid flow which is not desired to be utilized would be passed out the exhaust 25 to atmosphere, however, ducting means could also be associated with the exhaust 25 to direct the fluid flowing therefrom to any particular given utilization point.

Operation

The operation of the unit is relatively simple and is herein briefly described with respect to the condition when the unit is considered as operated on a fluid such as gas. While the unit is specifically described as operating on a gas, it is to be understood that the unit can be operated on any type of fluid whether the fluid is in the form of a liquid, a gas, or the combination of the two. The fluid such as a gas is introduced into the inlet 12 by a conduit, piping or any other applicable means, and upon entering the inlet 12 forms an annular ring of flow due to the central circular member 17. The annular flow is then divided into four equal portions due to the partitions 18 and 19 which extend the entire length of the body 11. Flow in any one of the four quadrants may be conducted through either of the outlets 21 and 22 of each respective quadrant. Assuming the flow in one of the quadrants to be passing through throat 29 over the relief 13 adjoining the wall of the body 11 again at point 14, it will be maintained there by the low pressure area caused by the fluid flow over the relief 13 acting in conjunction with the back pressure in outlet 22 and thereby maintain flow in or lock-on to the outlet 21. The flow will then pass through the outlet 21, pass the alternative outlet 22 at intersection 29 and be exhausted through the exhaust outlet 25. If, however, it is desirable to utilize a fluid pressure from the exit 24 for that given quadrant, the actuator will move the wedge 31 associated with the tab 15 of that particular quadrant so as to move the tab 15 past the relief 13 into the throat area 29 to disrupt the flow therein, and consequently the low pressure area adjacent the relief 13, to thereby direct the flow into passage 22 where it will sustain itself due to the low pressure area, formed by the relief 26 in conjunction with the wall 27 of the member 17, acting in conjunction with the back pressure in outlet 21. The fluid flow will then continue in the outlet 22 of that particular quadrant and pass through the alternative outlet 21 at intersection 29 to exit 24 from which it will be taken and directed to the desired point of utilization. As the fluid flow in passage 22 passes through passage 21 the static pressure thereof is transmitted back through the passage 21 so that there is maintained in conjunction with the low pressure adjacent the relief 26 an opposing pressure on the opposite side of the fluid flow in the alternative outlet 21. Likewise, when the fluid flow is in the outlet 21, the static pressure of that flow will be transmitted back through the alternative outlet 22, since the two outlets pass through each other at intersection 29, to work in conjunction with the low pressure area formed between the relief 13 and the wall at point 14 to thereby sustain the flow in the passage 21. This crossing of the two passages 22 and 21 to utilize the static pressure of the fluid flow in the opposite one of the passages is necessary to enable this device to operate in an atmosphere of zero or very little pressure. If there was no back pressure in the outlet in which no flow were flowing to act in conjunction with the low pressure area adjacent the outlet in which the fluid flow is flowing, there would be nothing to hold that fluid flow in the outlet in which it is flowing. As is apparent from the drawings, the fluid flow in each of the respective quadrants may be flowing in different outlets; that is to say, the fluid flow in one quadrant might be flowing in its respective outlet 21, while the fluid flow in the next quadrant might be flowing in its respective outlet 22, while the fluid flow in the next quadrant might again be flowing in its respective outlet 22, and so on.

As is apparent in the foregoing description, the present invention provides a fluid control device for the control of the flow of a source fluid to various points, which minimizes the number of components in a fluid distribution system and which minimizes the weight necessary to divide the flow of such a source fluid, and which is particularly applicable to the fluid systems of aerospace vehicles operating in a zero or negligible pressure atmosphere.

Obviously many modifications and variations of the present invention are possible in the light of the above teachings. It is therefore to be understood that within the scope of the appended claims the invention may be practiced otherwise than as specifically described.

What is claimed is:
1. A cylindrical bi-stable fluid valve means for use in space environments for subdividing a control fluid into separate flows which may be utilized to control the pitch and yaw of a space vehicle, said valve means comprising;
 a circular fluid inlet means,
 a circular member means disposed at the center of said circular inlet means and extending the length of said valve means for providing an annular fluid flow path,
 two partitions disposed at right angles within said valve means to support said circular member means and intersecting at the center of said circular member means for dividing said valve means into four equal quadrants to thereby divide said annular fluid flow into four equal paths,
 first tab means disposed in said valve means near said inlet means in each of said four quadrants for insertion into the respective fluid flow paths from the outer periphery of said divided annular fluid flow,
 second tab means disposed in said circular member means near said inlet means in each of said four quadrants for insertion into the respective fluid flow paths from the outer periphery of said circular member means,
 an annular flow divider means secured by said partitions in concentric relationship to the intersection of said partitions for providing two alternative outlets for each of said four paths,
 and said alternative outlets for each quadrant being disposed so as to pass through one another,
 whereby the annular fluid flow through said inlet means is subdivided into four paths and directed into one of the two respective crossing alternative outlets for each quadrant in accordance with the positions of the respective tab means which may be inserted into the fluid flow in the respective quadrants from either the exterior or the interior of the annular fluid flow so that when the fluid flow is in the first one of said alternative outlets of a respective quadrant, static pressure will be sustained in the second one of said alternative outlets of said respective quadrant, thereby to maintain the flow in said first one of said alternative outlets whenever said valve means is operated in a space environment.

2. A cylindrical bi-stable fluid valve comprising:
 a tubular body member;
 an inlet at the first end of said tubular body member;
 a circular member of varying diameter centrally supported within the length of said tubular body member to provide an annular fluid flow path;
 two partitions, the planes of which intersect at right angles at the center of said circular member, disposed within said tubular body member for support of said circular member and for subdividing said annular fluid flow path into four passages;
 an annular flow divider secured by said partitions in concentric relationship to said circular member for providing first and second outlets for each one of the respective four passages;
 said respective first outlets between the tubular body member and said annular flow divider being disposed so as to pass fluid past said annular flow divider, between said tubular body member and said circular member, to the exhaust outlet of said valve at the second end of said tubular body member;
 said respective second outlets between the circular member and said annular flow divider being disposed so as to pass fluid through said respective first outlets to an exit in said tubular body member;
 a first tab means slidably disposed in said tubular body means in juxtaposition to said inlet in each respective one of said four passages for insertion into said respective passage to shift the fluid flow therein from the respective first outlet to the respective second outlet;
 and a second tab means slidably disposed in said circular member in juxtaposition to said inlet in each respective one of said four passages for insertion into said respective passage to shift the fluid flow therein from the respective second outlet to the respective first outlet.

3. A device as claimed in claim 2 wherein;
 a first actuation means is provided for each of the respective first tab means in each of said passages for moving said respective first tab means into the respective passages,
 and a second actuation means is provided for each of the respective second tab means in each of said passages for moving said respective second tab means into the respective passages.

References Cited by the Examiner

UNITED STATES PATENTS

| | | | |
|---|---|---|---|
| 3,020,714 | 2/1962 | Eggers et al. | 137—81.5 X |
| 3,039,490 | 6/1962 | Carlson | 137—610 |
| 3,080,886 | 3/1963 | Severson | 137—83 X |
| 3,143,856 | 8/1964 | Hausmann | 137—81.5 X |
| 3,182,686 | 5/1965 | Zilberfarb | 137—81.5 X |

M. CARY NELSON, *Primary Examiner.*

BENJAMIN A. BORCHELT, *Examiner.*

R. LOTTMANN, H. KLINKSIEK, *Assistant Examiners.*